(12) United States Patent
Inoubli et al.

(10) Patent No.: US 10,577,447 B2
(45) Date of Patent: Mar. 3, 2020

(54) WATER-SOLUBLE BLOCK COPOLYMER AND USE THEREOF AS A SUPPORT MATERIAL FOR 3D PRINTING

(71) Applicant: Arkema France, Colombes (FR)

(72) Inventors: Raber Inoubli, Pau (FR); Sylvain Bourrigaud, Morlanne (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 16/653,140

(22) Filed: Oct. 15, 2019

(65) Prior Publication Data

US 2020/0040120 A1    Feb. 6, 2020

Related U.S. Application Data

(63) Continuation of application No. 15/538,271, filed as application No. PCT/FR2015/053464 on Dec. 14, 2015.

(30) Foreign Application Priority Data

Dec. 23, 2014  (FR) ..................................... 14 63192

(51) Int. Cl.
| | | |
|---|---|---|
| C08F 293/00 | (2006.01) | |
| B33Y 10/00 | (2015.01) | |
| B29C 64/00 | (2017.01) | |
| B33Y 70/00 | (2020.01) | |
| B29C 64/153 | (2017.01) | |
| B29C 64/40 | (2017.01) | |

(52) U.S. Cl.
CPC ........ *C08F 293/005* (2013.01); *B29C 64/153* (2017.08); *B29C 64/40* (2017.08); *B33Y 10/00* (2014.12); *B33Y 70/00* (2014.12); *C08F 2438/02* (2013.01)

(58) Field of Classification Search
CPC .... C08F 293/00; C08F 293/005; B33Y 10/00; B33Y 70/00; B29C 64/00; B29C 64/10; B29C 64/15; B29C 64/153; B29C 64/40
See application file for complete search history.

(56) References Cited

U.S. PATENT DOCUMENTS

| | | | |
|---|---|---|---|
| 6,353,065 B1 | 3/2002 | Charleaux et al. | |
| 6,569,967 B1 | 5/2003 | Couturier et al. | |
| 7,510,731 B2 | 3/2009 | Ranger et al. | |
| 7,635,740 B2 | 12/2009 | Charleaux et al. | |
| 7,951,888 B2 * | 5/2011 | Boupat ................... | A61K 8/90 526/319 |

FOREIGN PATENT DOCUMENTS

| | | | | |
|---|---|---|---|---|
| EP | 0947527 A1 * | 10/1999 | .......... | C08F 293/005 |
| EP | 0947527 A1 | 10/1999 | | |
| EP | 0970973 A1 | 1/2000 | | |
| EP | 1465665 A1 | 10/2004 | | |
| WO | 0049027 A1 | 8/2000 | | |
| WO | 2005082945 A1 | 9/2005 | | |
| WO | 201000725 A1 | 1/2010 | | |
| WO | WO-2010000725 A1 * | 1/2010 | ................ | C08F 2/22 |
| WO | 2010045147 A2 | 4/2010 | | |
| WO | 2012143182 A1 | 10/2012 | | |

OTHER PUBLICATIONS

International Search Report and Written Opinion for International Application No. PCT/FR2015/053,464, dated Mar. 17, 2016—7 Pages.

* cited by examiner

*Primary Examiner* — Jacob T Minskey
*Assistant Examiner* — Matthew Hoover
(74) *Attorney, Agent, or Firm* — RatnerPrestia

(57) ABSTRACT

The invention relates to a novel type of sacrificial polymer or support material for 3D printing, comprising a block copolymer consisting of:
at least one partially or totally hydrophilic elastomeric block, with a Tg of less than 30° C. and comprising at least one hydrophilic monomer, and
at least one water-soluble thermoplastic block with a Tg of greater than 30° C. and comprising at least one monomer bearing a carboxyl group,
said copolymer being extrudable and granulable, said copolymer being partially or totally soluble in water or in aqueous medium, and the mass proportion of the thermoplastic block being greater than 50% of the weight of said copolymer.

17 Claims, 1 Drawing Sheet

WATER-SOLUBLE BLOCK COPOLYMER AND USE THEREOF AS A SUPPORT MATERIAL FOR 3D PRINTING

CROSS-REFERENCE TO RELATED APPLICATIONS

This is a Continuation Application of U.S. application Ser. No. 15/538,271, filed 21 Jun. 2017, which is a national phase of International Application No. PCT/FR2015/053464, filed 14 Dec. 2015, which claims priority to French Application No. 1463192, filed 23 Dec. 2014. The disclosure of each of these applications is incorporated herein by reference in its entirety for all purposes.

FIELD OF THE INVENTION

The present invention relates in general to the field of three-dimensional printing (or 3D printing) of an object. This technology allows the additive manufacturing (AM) of a real object from a virtual object. It is based on cutting the 3D virtual object into 2D slices of very thin thickness. These thin slices are deposited one by one by fixing them onto the preceding slices, which reconstitutes the real object. Among the constituent materials of the object are plastic materials (especially acrylonitrile-butadiene-styrene (or ABS) and polylactic acid (or PLA)), wax, metal, plaster of Paris or ceramics. Examples of additive techniques are fused deposition modeling (FDM) and laser sintering.

Fused deposition modeling is a mechanical technique which consists in melting a filament of synthetic material (generally plastic of ABS or PLA type) through an extrusion nozzle heated to a temperature ranging between 160 and 270° C. A molten filament, with a diameter of the order of a tenth of a millimeter, emerges therefrom. This yearn is deposited online and bonds by remelting onto that which has been deposited previously. This technique makes it possible to create parts made of proper material, which have mechanical and thermal and a stability characteristics which are identical to those of injection-molded thermoplastic parts. This technique also has a major advantage concerning the support structure required for the production of the parts, since this construction support usually consists of a material other than that which constitutes the created object, this material being removed from said object when the process for constructing said object is finished.

According to one embodiment variant, the material used as support for the production of 3D objects is a polymer, also known as a sacrificial polymer. The present invention thus relates, more specifically, to a novel type of sacrificial polymer or support material for 3D printing, comprising a novel block copolymer.

BACKGROUND OF THE INVENTION

Certain techniques for the 3D printing of polymers, such as digital manufacturing systems, require the use of a sacrificial polymer to "support" the polymer of the object to be printed. This technique and the characteristics of this sacrificial polymer are described in WO 2010/045 147. According to said document, the main characteristics of this sacrificial polymer must be:
  solubility in aqueous medium (which is usually alkaline);
  a creep relaxation transition temperature (which is directly linked to the glass transition temperature Tg, according to the measuring protocol described in U.S. Pat. No. 5,866,058) of the order of that of the polymer to be printed (or of one of the fractions of the polymer to be printed). For example, for the printing of ABS, the Tg of the sacrificial polymer must be at least 120° C.;
  a capacity to be compounded with additives allowing an improvement in the mechanical properties.

The support material described in WO 2010/045 147 contains a copolymer and a polymeric impact modifier. According to one embodiment, said copolymer comprises monomer units bearing a carboxyl group and monomer units comprising a phenyl group. According to another embodiment, the support is formed from a first copolymer and a second copolymer. Said first copolymer comprises monomer units bearing a carboxyl group, monomer units comprising a phenyl group and monomer units comprising carboxylate ester groups. Said second copolymer comprises a plurality of epoxy-terminated carboxylate ester groups. Examples 1-15 describe the use as support material of a mixture of copolymer and of impact modifier, said copolymer being based on butyl acrylate, styrene and methacrylic acid. Partial anhydrification of the acid functions allows it to achieve Tg values of the order of 120° C. (measured by DSC) and thus to be able to print polymers such as ABS. The system used in said patent is derived from the compounding of the copolymer with an impact additive of the type such as Elvaloy® (DuPont) and/or Lotader® (Arkema). During the preliminary compounding step, the impact modifier reacts, via the epoxy functions, with the acid functions of said copolymer.

The Applicant has now found that it is possible to prepare a block copolymer acting solely as support material, said block copolymer having the properties required to fulfil this function (namely solubility in aqueous medium and a high glass transition temperature Tg of the major phase, preferably above 120° C.) without it being necessary to mix it beforehand with an additive.

SUMMARY OF THE INVENTION

According to a first object, the invention relates to a support material for an additive system for the digital manufacture of objects, said support material consisting of a block copolymer consisting of:
  at least one partially or totally hydrophilic elastomeric block, with a Tg of less than 30° C. and comprising at least one hydrophilic monomer, and
  at least one water-soluble thermosplastic block with a Tg of greater than 30° C. and comprising at least one monomer bearing a carboxyl group.

Characteristically, the mass proportion of the thermosplastic block(s) is greater than 50% preferably greater than or equal to 60% by weight of said copolymer. This give the block copolymer a thermoplastic nature.

According to one embodiment, the diblock copolymer according to the invention is extrudable.

According to one embodiment, said diblock copolymer is granulable, having an elastic shear modulus G' of greater than 0.1 MPa at the cutting temperature. Specifically, it is known to those skilled in the art that below a certain modulus level, it is difficult to granulate a polymer, including with cutting under water. This modulus limit might be linked to the values presented by the Dahlquist criterion, since, below this limit, even using anticaking agents, the elastomeric nature of the polymer cannot avoid caking problems.

Furthermore, said copolymer is partially or totally soluble in water or in aqueous medium. According to one embodiment, said copolymer is soluble in alkaline medium having a pH of greater than 8 and preferentially greater than 10.

Advantageously, the mass content of the carboxyl functions in the diblock copolymer ranges from 10 to 40%, preferably from 20 to 35%, relative to the weight of said copolymer.

The invention also relates to a process for preparing said block copolymer by controlled radical polymerization.

Another subject of the invention is directed toward a process for manufacturing objects via a digital manufacturing additive (or 3D printing) system, which uses as support material the block copolymer according to the invention.

DETAILED DESCRIPTION

Figure 1:
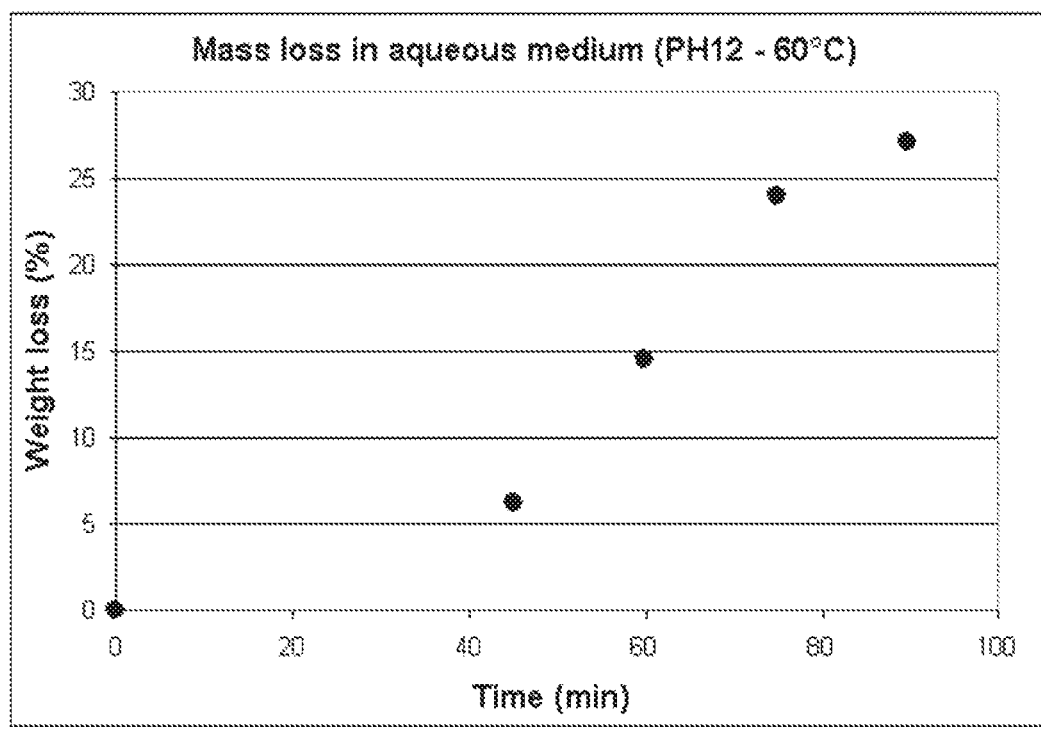
FIG. 1 represents a diagram illustrating the solubility of the diblock copolymers according to the invention in aqueous medium, measured in terms of weight loss of the copolymer as a function of time.

The invention is now described in greater detail and in nonlimiting manner in the description that follows.

According to a first aspect, the invention relates to a support material for an additive system for the digital manufacture of objects, said support material consisting of a copolymeric block copolymer formed from at least one first elastomeric block and at least one second thermoplastic block.

The first block is an elastomeric block with a Tg of less than 30° C. and comprising at least one hydrophilic monomer. The term "monomer" means any monomer that is polymerizable or copolymerizable via a radical route. The term "monomer" covers mixtures of several monomers.

The term "Tg" denotes the glass transition temperature of a polymer, measured by DSC according to ASTM E1356. The term "Tg of a monomer" is also used, to denote the Tg of the homopolymer having a number-average molecular mass Mn of at least 10 000 g/mol, obtained by radical polymerization of said monomer.

Said hydrophilic monomer is advantageously chosen from:
  acrylic acid or methacrylic acid,
  hydroxyalkyl (meth)acrylates and (meth)acrylamides in which the alkyl group comprises 2 to 4 carbon atoms, in particular 2-hydroxyethyl methacrylate, 2-hydroxypropyl methacrylate, 4-hydroxybutyl methacrylate, dimethylacrylamide, N-(2-hydroxypropyl) -(meth) acrylamide; polyethylene glycol or glycol acrylates and methacrylates optionally substituted on their terminal function with alkyl, phosphate, phosphonate or sulfonate groups.

The second block is a thermoplastic block with a Tg of greater than 30° C., preferably between 50° C. and 250° C. It comprises at least one monomer bearing a carboxyl group. This monomer is preferably chosen from: acrylic acid, methacrylic acid, crotonic acid, itaconic acid, fumaric acid, maleic acid, citraconic acid, vinylbenzoic acid, the acrylamidoglycolic acid of formula $CH_2=CH-CONHCH(OH)COOH$, carboxylic anhydrides bearing a vinyl bond, and also salts thereof; and mixtures therof. It is understood that, for the esters mentioned above, they will, after polymerization, be hydrolyzed to give units bearing —$CO_2H$ functions.

By virtue of the hydrophilic monomer which comprises carboxyl functions that are capable of establishing hydrogen bonds with water molecules, the thermoplastic block is water-soluble or water-dispersible.

A polymer is said to be "water-soluble" if it is soluble in water (in other words, if it forms a clear solution) in a proportion of at least 5% by weight, at 25° C. Said thermoplastic block is especially soluble in running water or basic water.

A polymer is said to be "water-dispersible" if it forms, at a concentration of 5%, at 25° C., a stable suspension of fine, generally spherical, particles. The mean size of the particles constituting said dispersion is less than 1 µm, and more generally ranges between 5 and 400 nm, preferably from 10 to 250 nm. These particle sizes are measured by light scattering.

According to one embodiment, the block copolymer consists of an elastomeric block and a thermoplastic block.

The hydrophilic thermoplastic block is rigid at room temperature and constitutes the major phase of the block copolymer according to the invention.

According to one embodiment, the diblock copolymer according to the invention has an elastic shear modulus G' of greater than $10^8$ at room temperature, which shows that, according to the Dahlquist tack criterion, it has no tacky nature.

According to a second aspect, the invention relates to a process for preparing the diblock copolymer described above. According to one embodiment, this diblock copolymer is obtained by controlled or living radical polymerization. Controlled radical polymerization makes it possible to reduce the reactions of the growing radical species, in particular the termination step, these being reactions which, in standard polymerization, irreversibly interrupt the growth of the polymer chain without control of the termination reactions. To solve this problem and to reduce the probability of termination reactions, it has been proposed to use "dormant" radical species, in the form of a bond with low dissociation energy, which are capable of blocking and restarting the polymerization as desired. Thus, depending on the need, periods of growth of the active radical species and periods of stoppage of growth are obtained. This alternation leads to an increase in the average molecular mass depending on the reaction progress, while at the same time control its execution. This control may be reflected by a narrower molecular mass distribution (lower polydispersity index) than in a standard radical route and also, and above all, may make it possible to synthesize block copolymers by restarting the polymerization with a new monomer using a "dormant" polymer species.

In principle, any living radical polymerization process which is compatible with the choice of the monomers may be used to prepare a block copolymer. A preferred method is controlled radical polymerization in the presence of a nitroxide mediator, since it makes it possible to polymerize a wide variety of monomers, especially acrylic monomers and acrylic monomers functionalized with carboxyl groups. To this end, use may be made, for example, of processes using as stable free radicals nitroxides such as SG1 or the alkoxyamine derivatives thereof as described in patent EP 0 970 973 and patent applications WO 00/49027 and WO 2005/082 945.

A preferred controlled radical polymerization initiator is the alkoxyamine of formula (I) below:

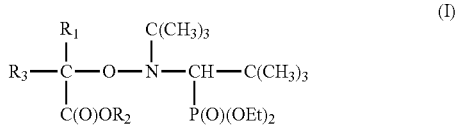

in which:
- R₁ and R₃, which may be identical or different, represent a linear or branched alkyl group, containing a number of carbon atoms ranging from 1 to 3;
- R₂ represents a hydrogen atom or, a linear or branched alkyl group containing a number of carbon atoms ranging from 1 to 8, a phenyl group, an alkali metal such as Li, Na, K, an ammonium ion such as NH4+, NHBu³⁺; preferably, R₁ and R₃ being CH₃ and R₂ being H, the abbreviation "Bu" meaning the butyl group.

An alkoxyamine that may be used to design the diblock copolymers of the invention, denoted by the name BlocBuilder®, corresponds to formula (II) below, in which the abbreviation "Et" means an ethyl group:

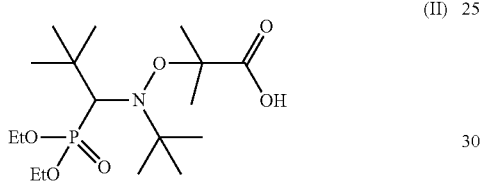

The polymerization generally proceeds in several steps according to the following general scheme:
- in a first step, polymerization of the first monomer or mixture of hydrophilic monomers is performed to form a macroinitiator or precursor;
- in a second step, polymerization of the second block constituted by a monomer or a mixture of monomers comprising at least one monomer bearing a carboxyl group, at the end of the macroinitiator, is performed.

The use of this process allows the synthesis of the diblock copolymers according to the invention in solution, in suspension, in bulk, in organic solvent or in emulsion, which then makes it possible to obtain the products in the form of an aqueous latex comprising a water-stable emulsion of these copolymers.

The organic solvent, when it is necessary for implementing a polymerization method, may be chosen from toluene, xylene, chloroform, ethyl acetate, methyl ethyl ketone, dioxane, tetrahydrofuran or dimethylformamide.

The process of the invention is generally performed at a pressure that may range from 0.5 to 20 bar and at a temperature that may range from 50 to 180° C., and preferably from 90 to 110° C.

The diblock copolymers obtained have controlled molecular masses and molecular mass distributions. Advantageously, the weight-average molecular mass $\overline{Mw}$ of the diblock copolymer is between 10 000 and 1 000 000 g/mol, preferably between 50 000 and 300 000 g/mol. The number-average molecular mass $\overline{Mn}$ is preferably between 10 000 and 50 000.

The molecular mass distribution or polydispersity index $\overline{Mw}/\overline{Mn}$ is generally less than 4, advantageously less than 2. The masses $\overline{Mw}$ and $\overline{Mn}$ of the present invention are expressed as polyethylene glycol equivalents and measured by size exclusion chromatography, SEC, this technique also being known as GPC which stands for gel permeation chromatography.

According to another aspect, the invention relates to a process for the manufacture of objects via a digital manufacturing additive (or 3D printing) system, which uses as support material the block copolymer according to the invention. Advantageously, this support material is soluble in aqueous medium, which allows it to be easily removed once the object has been printed. Furthermore, this support material is compatible for use with constituent materials of the object to be manufactured, having a wide range of glass transition temperatures. According to one embodiment, the digital manufacturing additive system is fused deposition modeling. According to another embodiment, the digital manufacturing additive system is laser sintering.

According to one embodiment, the elastomeric block contains butyl acrylate (BA) and methoxypolyethylene glycol methacrylate (MPEGMA) and the thermoplastic block contains butyl acrylate, methacrylic acid (MAA) and styrene (S) forming a P(BA-MPEGMA)-b-P(BA-S-MAA) diblock copolymer.

EXAMPLES

The examples that follow illustrate the invention without limiting it.

Example 1

Synthesis of a P(BA-MPEGMA)-b-P(BA-S-MAA) Copolymer

The synthesis of this diblock copolymer takes place in two steps:
- 1ˢᵗ block P(BA-MPEGMA) in bulk, followed by stripping of the unreacted monomers
- 2ⁿᵈ block P(BA-S-MAA) in solvent 1.1. Synthesis of the Block P(BA-MPEGMA)

The synthesis of this first block is performed via a bulk polymerization process using a reactor of Ingénieur Büro type.

| Reagents: | |
|---|---|
| butyl acrylate (BA) | 624 g |
| methoxypolyethylene glycol methacrylate (MPEGMA) | 126 g |
| BlocBuilder ® | 8.26 g |

A number-average molecular mass of 27 000 g/mol at 75% conversion is targeted.

The reagents are weighed out and then mixed with magnetic stirring, and are then introduced into the reactor by vacuum pressure. The reactor is stirred (250 rpm). The medium is degassed by alternating three cycles of nitrogen pressure and vacuum. The polymerization takes place in three temperature stages: 90° C. for 60 min, then 100° C. for 90 min, then 110° C. The polymerization time is 345 min. The conversion is monitored by dry extracts collected every hour from the samples. Since MPEGMA is not volatile, only the conversion of the butyl acrylate can be monitored by measuring the solids content (125° C. thermobalance and 125° C. vacuum oven).

When the targeted conversion is reached, the temperature is lowered to 80° C. Once the nominal temperature has been reached, the system is gradually placed under vacuum, and the unreacted monomers are distilled off (recovery in liquid nitrogen traps). The system is left for about 90 min at 80° C. and under maximum vacuum. When the distillation is complete, the nominal temperature is lowered to 40° C. Once this nominal temperature has been reached, 400 g of ethanol are introduced (by vacuum pressure) so as to dilute the medium. The system is left stirring for a few hours at 40° C. so as to thoroughly homogenize the solution. This solution is then recovered.

1.2 Synthesis of the Block P(BA-S-MAA)

The synthesis is performed in the solvent process, using an ethanol/toluene mixture with a mass ratio of 60/40. The synthesis is performed with 45% of solvent relative to the total feedstock. A 30/30/40 mass ratio BA/S/MAA mixture is introduced.
A P(BA-MPEGMA)-b-P(BA-S-MAA) copolymer with a mass composition of 30/70 with a 65% conversion of the $2^{nd}$ block is targeted.
The feedstock is prepared as indicated below:
$1^{st}$ block diluted in ethanol: 200 g
BA/S/MAA: 104/104/138.7 (g)
ethanol/toluene: 138.4/161.2 (g)
The molar masses (PS equivalent) of this copolymer are as follows:
  Mp=93 600 g/mom
  Mn=55 100 g/mol
  Mw=97 300 g/mom
  Ip=1.77

Example 2

Measurement of the Solubility in Aqueous Medium of the Diblock Copolymer P(BA-MPEGMA)-b-P(BA-S-MAA)

For the solubility test, a pellet 20 mm in diameter and 1 mm thick is prepared with a press and at a temperature of 120° C.
The pellet is placed in a gently stirred aqueous medium and mass loss measurements are taken as a function of time. The results obtained are represented in the attached FIG. 1.
Dissolution of the sample with a rate of mass loss of the order of 0.25% per minute is observed.

Example 3

Figure 2:
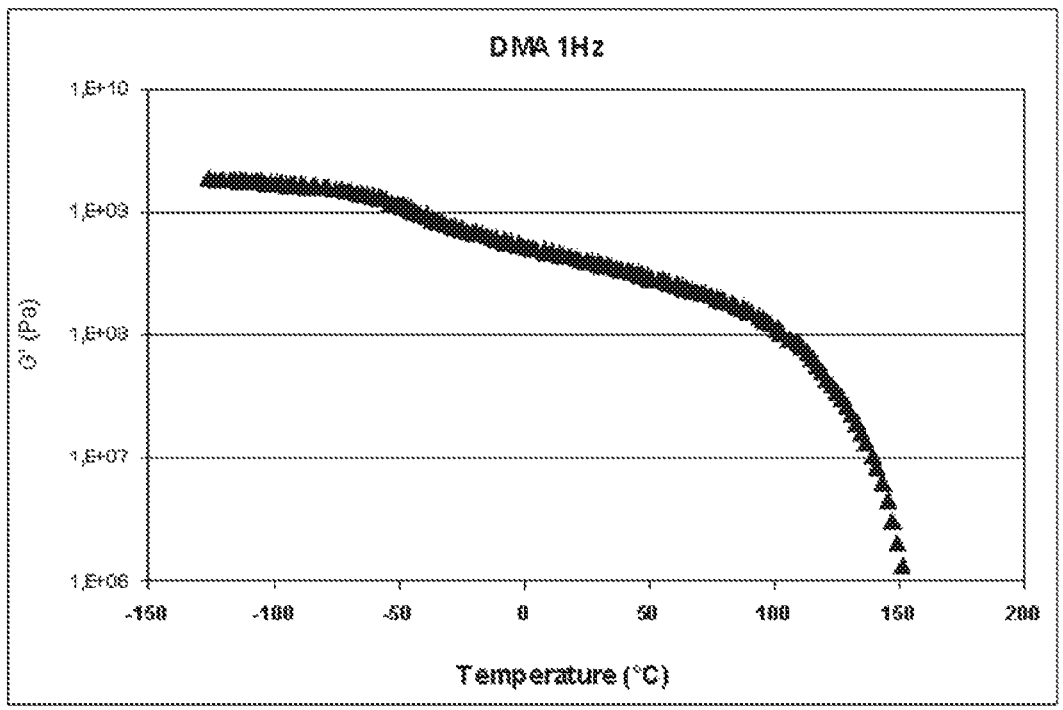
FIG. 2 represents a diagram illustrating the variation of the elastic modulus G' of a copolymer according to the invention, as a function of the temperature.

Measurement of the Elastic Shear Modulus (G') by Dynamic Mechanical Analysis (DMA) of the P(BA-MPEGMA)-b-P(BA-S-MAA) Diblock Copolymer The elastic shear modulus is measured using an ARES strain-controlled rheometer (TA Instrument). A rectangular bar of dimensions 40×10×2 mm is prepared by molding. The analysis (temperature scanning at a frequency of 1 Hz) is performed on a geometry of rectangular torsion type.
The variations in modulus G' as a function of temperature (from −80 to 150° C.) are presented in FIG. 2.
It is observed that, at room temperature, an elastic modulus G' of about $4 \times 10^8$ Pa is measured, which is evidence of behavior of thermoplastic type of the copolymer according to the invention.

The invention claimed is:

1. A support material for an additive system for a digital manufacture of objects, said support material comprising a block copolymer wherein the block copolymer comprises:
   at least one partially or totally hydrophilic elastomeric block, wherein the elastomeric block has a Tg of less than 30° C. and comprises at least one hydrophilic monomer, and
   at least one water-soluble thermoplastic block, wherein the thermoplastic block has a Tg of greater than 30° C. and comprises at least one monomer bearing a carboxyl groups;
   wherein the copolymer is partially or totally soluble in water or in aqueous medium, and a mass proportion of the thermoplastic block is greater than 50% of a weight of the block copolymer.

2. The support material according to claim 1, wherein the hydrophilic monomer is selected from the group consisting of:
   acrylic acid; methacrylic acid;
   hydroxyalkyl (meth)acrylates in which the alkyl group comprises 2 to 4 carbon atoms; (meth)acrylamides in which the alkyl group comprises 2 to 4 carbon atoms; polyethylene glycol and glycol acrylates optionally substituted on their terminal function with alkyl, phosphate, phosphonate or sulfonate groups; polyethylene glycol and glycol methacrylates optionally substituted on their terminal function with alkyl, phosphate, phosphonate or sulfonate groups; and mixtures thereof.

3. The support material according to claims 1, wherein the monomer bearing a carboxyl group is selected from the group consisting of: acrylic acid, methacrylic acid, crotonic acid, itaconic acid, fumaric acid, maleic acid, citraconic acid, vinylbenzoic acid, the acrylamidoglycolic acid of formula $CH_2=CH-CONHCH(OH)COOH$, carboxylic anhydrides bearing a vinyl bond, salts thereof, and mixtures thereof.

4. The support material according to claims 1, wherein the block copolymer consists of an elastomeric block and a thermoplastic block.

5. The support material according to claim 1, wherein a mass content of the carboxyl functions in the block copolymer ranges from 10 to 40 relative to the weight of said the block copolymer.

6. The support material according to claim 1, wherein the block copolymer is extrudable and granulable.

7. The support material according to claim 1, wherein the mass proportion of the thermoplastic block is greater than or equal to 60% of the weight of said copolymer.

8. The support material according to claim 1, wherein a Tg of said thermoplastic block of said block copolymer is between 50° C. and 250° C.

9. The support material according to claims 1, wherein the block copolymer has the structure: P(BA-MPEGMA)-b-P(BA-S-MAA).

10. A process for preparing a block copolymer used as support material according to claim 1, wherein the process comprises carrying out controlled radical polymerization in the presence of a nitroxide mediator.

11. The process according to claim 10, wherein the controlled radical polymerization uses an alkoxyamine of formula II:

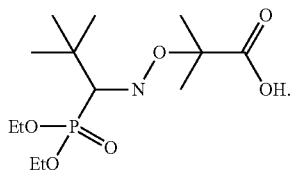 (II)

12. A process for manufacturing objects via a digital manufacturing additive system which uses as support material the block copolymer according to claim 1.

13. The process according to claim 12, wherein the digital manufacturing additive system is fused deposition modeling.

14. The process according to claim 12, wherein the digital manufacturing additive system is laser sintering.

15. The support material according to claim 1, wherein the hydrophilic monomer is selected from the group consisting of: 2-hydroxyethyl methacrylate, 2 hydroxypropyl methacrylate, 4-hydroxybutyl methacrylate, dimethylacrylamide, and N-(2-hydroxypropyl)(meth)acrylamide, and mixtures thereof.

16. The support material according to claim 2, wherein the monomer bearing a carboxyl group is selected from the group consisting of: acrylic acid, methacrylic acid, crotonic acid, itaconic acid, fumaric acid, maleic acid, citraconic acid, vinylbenzoic acid, the acrylamidoglycolic acid of formula $CH_2$=CH—CONHCH(OH)COOH, carboxylic anhydrides bearing a vinyl bond, salts thereof, and mixtures thereof.

17. The support material according to claim 15, wherein the monomer bearing a carboxyl group is selected from the group consisting of: acrylic acid, methacrylic acid, crotonic acid, itaconic acid, fumaric acid, maleic acid, citraconic acid, vinylbenzoic acid, the acrylamidoglycolic acid of formula $CH_2$=CH—CONHCH(OH)COOH, carboxylic anhydrides bearing a vinyl bond, salts thereof, and mixtures thereof.

* * * * *

UNITED STATES PATENT AND TRADEMARK OFFICE
CERTIFICATE OF CORRECTION

PATENT NO. : 10,577,447 B2
APPLICATION NO. : 16/653140
DATED : March 3, 2020
INVENTOR(S) : Raber Inoubli and Sylvain Bourrigaud It is certified that error appears in the above-identified patent and that said Letters Patent is hereby corrected as shown below:

In Claim 1, Line 13, please correct the text to read --group-- instead of "groups".

In Claims 3, 4 and 9, please correct the text to read --claim 1-- instead of "claims 1".

In Claim 5, Line 47, please correct the text to read --10 to 40%-- instead of "10 to 40".

In Claim 11, please correct the chemical structure of formula (II) to

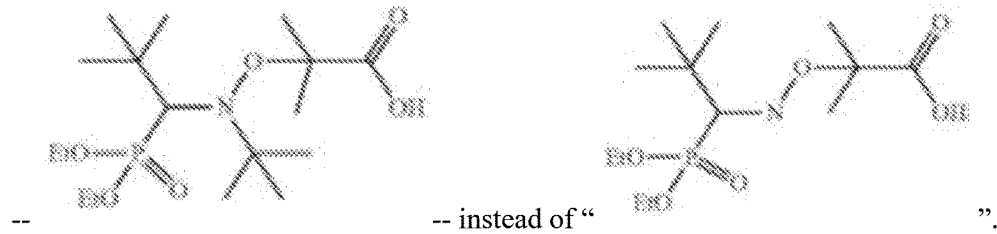

-- instead of " ".

Signed and Sealed this
Eighth Day of December, 2020

Andrei Iancu
*Director of the United States Patent and Trademark Office*